Oct. 10, 1950  J. S. JOHNSON  2,525,413
TESTING APPARATUS FOR GENERATOR WINDING INSULATION
Filed Nov. 7, 1946

WITNESSES:

INVENTOR
John S. Johnson.
BY
ATTORNEY

Patented Oct. 10, 1950

2,525,413

UNITED STATES PATENT OFFICE 2,525,413

TESTING APPARATUS FOR GENERATOR WINDING INSULATION

John S. Johnson, Pittsburgh, Pa., assignor to Westinghouse Electric Corporation, East Pittsburgh, Pa., a corporation of Pennsylvania Application November 7, 1946, Serial No. 708,393

8 Claims. (Cl. 175—183)

My invention relates to the testing of turn-insulation on wound machines, and it has particular relation to the testing of the turn-insulation of a wound core-member of a dynamo-electric machine, having a winding-portion or circuit comprising a large number of serially connected turns in series.

Heretofore, several different turn-insulation testing-methods have been known, involving the application of a suitable repetitive surge-voltage or test-voltage to the terminals of the machine, or to the terminals of any phase-winding of the machine, in the case of a polyphase generator or motor. In large or high-voltage machines, having many turns in series, between any pair of winding-terminals, the application of the test-voltage to the winding-terminals does not result in sufficiently stressing the turn-insulation to weed out weak insulation which is apt to fail in the operation of the machine, because the magnitude of the highest test-voltage which can be applied to the winding-terminals is limited by the conductor-to-ground insulation on the first and last turns of the series circuit of the winding. Thus, if enough voltage is applied to the whole winding, comprising a large number of turns in series, to give enough turn-to-turn voltage for adequate testing purposes, then the end turns, that is, the first and last turns, are at too high a voltage to ground.

The principal object of my present invention is to provide a new testing apparatus and circuits, for applying the surge-voltage successively to each of the different coils, in a winding having a plurality of serially connected coils, with suitable wave-responsive apparatus, connected in series with the entire series of serially connected coils, for detecting any coil having a faulty insulation. Preferably, the wave-responsive apparatus is a cathode-ray oscilloscope, which shows, by substantially superimposed traces, the fault-free condition of any two coils to which the surge-voltage is successively applied. Preferably, also, a test-coil is utilized, being held in the air-gap in the location of any machine-coil to be tested, and being impressed with the repetitive surge-voltage so that it will act as the primary winding of a transformer for inducing the desired testing-voltage in the machine-winding coil under test.

With the foregoing and other object in view, my invention consists in the apparatus, circuits, parts and methods hereinafter described and claimed, and illustrated in the accompanying drawing, wherein:

Figure 3:
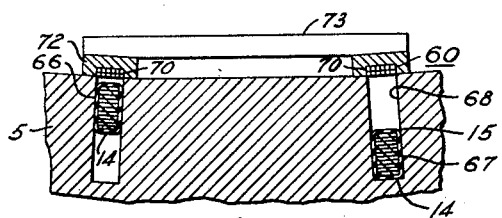
Fig. 3 is a diagrammatic fragmentary transverse section through the wound core-member of an electrical machine under test, showing the position of a test-coil in relation to the winding-coil which is being tested.

My invention is particularly applicable ot the testing of the turn-insulation of a wound core-member of a dynamo-electric machine, that is, the testing of the turn-to-turn coil-insulation in one of the two core-members of a dynamo-electric machine, the two core-members being separated by the air-gap of the machine, and being relatively rotatable, one with respect to the other, one core-member being usually stationary, while the other is the rotating member of the machine. The winding to be tested may be located on either one of these two core-members of the machine. In the particular application of my invention which is illustrated in the drawing, the machine to be tested is a 3300 H. P. synchronous motor, in which the winding to be tested is the primary winding of the machine, and is located on the stator-core 5, as shown in Fig. 3, the air-gap of the machine being bounded, on one side, by the bore of the stator-core. In other words, the stator-core 5 is disposed on one side, the outside, in this case, of a cylindrical air-gap of the motor to be tested.

My invention is particularly applicable to a machine having a large number of serially connected turns in any winding-portion or circuit of the machine being tested. For example, in the 3300 H. P. motor which has been referred to, each of the three phases of the machine contains twelve parallel-connected circuits, having a common pair of machine-terminals or phase-terminals, and each circuit has eight coils in series, with ten turns in each coil, making a total of eighty turns in series.

Figure 1:
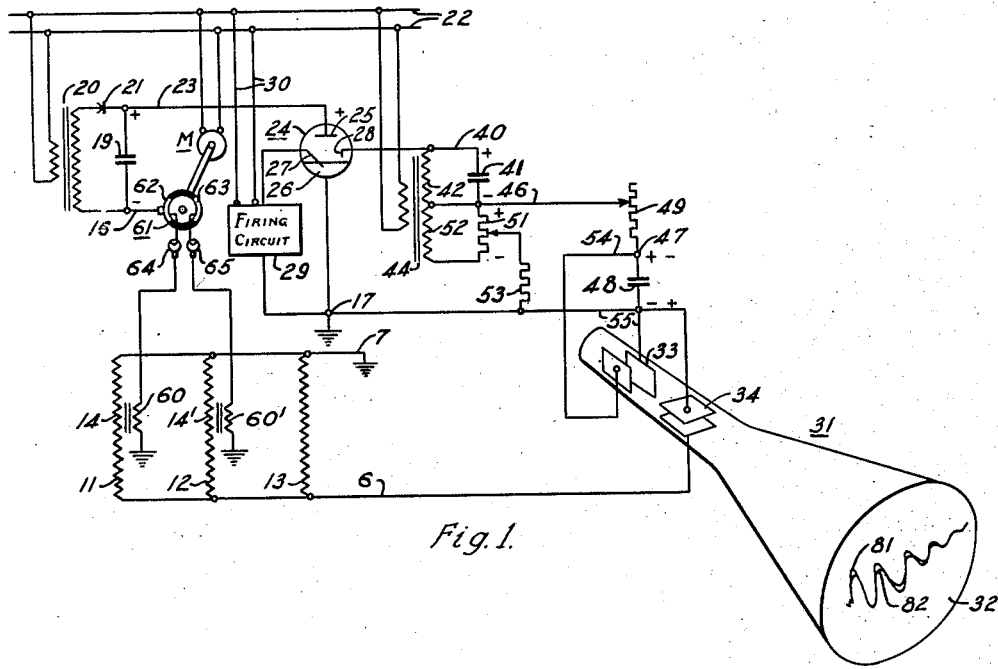
Figure 1 is a diagrammatic view of simplified circuits and apparatus illustrating my invention in a preferred form of embodiment.
Figure 2:
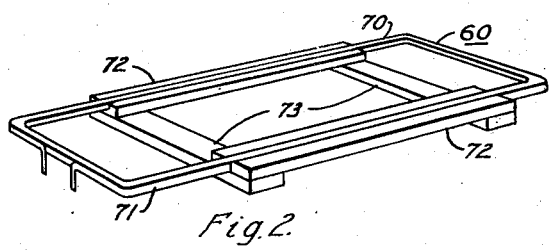
Fig. 2 is a perspective view of a testing-coil.

In Fig. 1, the two machine-terminals, of one of the phases of the primary winding of the machine under test, are indicated at 6 and 7, and three of the twelve parallel-connected phase-groups or circuits are indicated at 11, 12 and 13, each circuit having eight ten-turn coils 14 (Fig. 3), all connected in series with each other, between the machine-terminals 6 and 7 (Fig. 1).

In accordance with my invention, I have provided testing-apparatus and circuits, for testing the turn-to-turn insulation 15 (Fig. 3) in one of these coils 14. I provide a suitable source for supplying a repetitive surge-voltage, for testing purposes, this repetitive surge-voltage being produced across terminals 16 and 17 (Fig. 1), the terminal 17 being illustrated as being grounded. The source of repetitive surges consists essentially of a capacitor 19, which is kept unidirectionally charged by any suitable means, such as a step-up transformer 20 and a rectifier 21, the step-up transformer 20 being illustrated as being energized from an ordinary 60-cycle circuit 22. The negative terminal of the surge-delivering capacitor 19 is illustrated as being connected to the previously mentioned surge-terminal 16. The positive terminal of the surge-delivering capacitor 19 is indicated at 23, and this terminal is connected to the grounded surge-terminal 17 through a suitable switching-device, which is indicated as an ignitron 24 having a main anode 25, a mercury cathode 26, a make-alive electrode 27, and an auxiliary anode 28. The make-alive electrode 27 is energized from a firing-circuit, which is diagrammatically indicated at 29, and which is energized from the 60-cycle source or line 22, as indicated by the circuit 30, so as to fire the ignitron during each cycle of the 60-cycle circuit.

In accordance with my invention, a suitable wave-responsive apparatus is energized from, or connected in series with, the machine-terminals 6 and 7. Various types of wave-responsive apparatus are known in the art, including a wave-meter or frequency-meter which responds to the frequency of the surge, and hence to the inductance of the coil or winding under test. Another known form of wave-responsive apparatus is that which I have chosen to illustrate in the drawing, as my preferred form of apparatus, said wave-responsive apparatus being a cathode-ray oscilloscope 31, which gives a visual indication or trace of a moving electron-beam on the fluorescent oscilloscope-screen 32.

The oscilloscope 31 has two pairs of deflection-electrodes or plates, through or between which the electron-beam passes, these plates being excited with suitable voltages, so that the beam will be attracted or bent toward the more positive plate of each pair. There are two horizontally separated vertical plates 33, which are supplied with a voltge which increases linearly with time, to sweep the beam across the screen 32 in a horizontal direction, thus determining the sweep-speed. There are also two vertically separated horizontal electrodes 34, which are impressed with the voltage to be investigated. The fluorescent quality of the oscilloscope-screen 32 provides a sufficient persistence-of-vision effect to make the trace of the rapidly moving electron-beam remain visible for a certain small time after the beam has passed.

The vertical-deflection electrodes 34 of the oscilloscope are energized from the machine-terminals 6 and 7.

The horizontal-deflection electrodes 33 of the oscilloscope are excited by any suitable means which supplies a steadily increasing unidirectional voltage which starts to increase at substantially the same moment when the ignitron 24, or other repetitive circuit-making device, becomes conducting so as to discharge the surge-capacitor 19 through the testing circuit, which will be subsequently described. The particular illustrated horizontal-deflection excitation-means for the oscilloscope-plates 33 is one which is described and claimed in a copending application of E. F. Harter, Serial No. 708,398, filed November 7, 1946, and assigned to the Westinghouse Electric Corporation. It makes use of the auxiliary anode 28 of the ignitron 24, because this auxiliary anode becomes conductively connected to the cathode 26 at substantially the same instant when the main anode 25 becomes conductively connected to the cathode.

The terminal of the auxiliary anode 28 is connected to the positive terminal 40 of a capacitor 41, which is energized from the top portion 42 of the secondary winding of a transformer 44, the primary of which is energized from the 60-cycle circuit 22, in such polarity that the top terminal 40 of the secondary winding is positive at the moment when the ignitron 24 is fired, during each cycle of the 60-cycle circuit. The negative terminal 46 of the capacitor 41 is connected to the upper terminal 47 of another capacitor 48, a current-limiting resistance 49 being included in this connection.

The last-mentioned capacitor 48, immediately prior to the firing of the ignitron 24, is initially energized so that its upper terminal 47 has a suitable positive potential, which is supplied by a potentiometer 51 which is energized from the bottom portion 52 of the secondary winding of the transformer 44, a suitable current-limiting resistor 53 being also included in this connection. This initial positive potential is applied, from the terminal 47 of the capacitor 48, to the left-hand horizontal-deflection plate 33 of the oscilloscope, as by a conductor 54, so as to initially swing the electron-beam over to the left-hand side of the screen 32, ready to be swept across the screen to show a trace of the voltage-wave which is applied to the vertical-deflection plates 34. The bottom terminal of the capacitor 48 is connected, at 55, to the right-hand horizontal-deflection plate 33, and also to the grounded cathode terminal 17 of the ignitron 24.

As soon as the ignitron 24 is fired, so as to apply a surge-voltage across the surge-circuit terminals 16 and 17, the auxiliary electrode 28 of the ignitron becomes conductively connected to the cathode-circuit 17, thus applying the relatively large positive voltage of the capacitor 41 to the right-hand horizontal-deflection plate 33 of the oscilloscope, this positive voltage being larger than, and opposed to, the initial charge of the other capacitor 48. The rate of discharge of the capacitor 41 is determined by the magnitude of the resistor 49, which controls the time-scale of the trace on the oscilloscope-screen 32, or the sweep-speed of the oscilloscope. Ultimately, the charge of the capacitor 48 becomes reversed, as indicated by the second set of polarity-marks which are shown in Fig. 1.

In the particular form of my invention which is shown in Fig. 1, the method of detecting a ground or fault in the turn-insulation is to apply the surge-voltage of the terminals 16—17 successively to each of the different coils of the machine-winding to be tested, so as to produce, on the oscilloscope-screen 32, superimposed traces of the resultant wave-form in the machine-coils. Any substantial lack of coincidence of successive traces will show up as a double trace on the screen 32.

The successive switching-operations on the test-voltage, to apply said voltage to different coils of the machine to be tested, may be effected manually, or by any automatic circuit-changing or commutating means. Also, any suitable method, either inductive or conductive, may be utilized to make the repetitive surge-voltage, of the surge-circuit terminals 16—17, effective in successive coils of the machine being tested.

In accordance with one feature of my invention, I have provided a special test-coil 60, which inductively applies the repetitive surge-voltage, by transformer-action, to the machine-coil 14 under test, but in some of the broader aspects of my invention I am not limited to the use of the induction or transformer method of applying the repetitive surge-voltage to the coil 14 to be tested.

In the particular form of voltage-trace-comparing apparatus which I have shown in Fig. 1, I utilize two test-coils 60 and 60', which are respectively disposed in inductive relation to two machine-coils 14 and 14' which are located in similar electrical positions in two of the parallel-connected circuits 11 and 12 of the phase-winding under test. I also utilize a rotating commutator 61, for alternately applying the voltage of the surge-terminal 16 to the first one, and then the other, of the two test-coils 60 and 60'. Thus, the commutator 61 has two conducting segments 62 and 63, which are respectively connected, through slip-rings 64 and brushes 65, to the respective test-coils 60 and 60'. The commutator 61 is preferably driven, in a known manner, by means of a synchronous motor M which is energized from the 60-cycle line 22.

In making the test, the two test-coils 60 and 60' are placed in the air-gap of the wound core-member 5 which is to be tested, this being done before the other core-member of the machine is assembled. Fig. 3 shows such a wound core-member 5, as the stator-member, which is also the primary member, of a large synchronous motor. The two test-coils 60 and 60' are applied to the air-gap at the locations of the two machine-coils 14 and 14', which are to be compared with each other to see if their voltage-traces coincide on the oscilloscope screen 32, these two machine-coils 14 and 14' being located in similar electrical positions, in two of the parallel-connected machine-winding circuits 11 and 12, so that they ought to have identical traces, if neither coil is faulted. The position of one of the test-coils 60 with respect to one of the machine-coils 14 is shown in Fig. 3.

It should be noted that all of the machine-coils have the same span, that is, the same peripheral distance or chord between the top coil-sides 66 and the bottom coil-sides 67, in different slots 68 of the core-member 5. This circumstance makes it possible to utilize a test-coil construction 60, having two coil-sides 70 and 71, having a span corresponding to the span of the machine-coils 14. Each of the coil-sides, 70 and 71, of each test-coil 60 is preferably encased, or partially surrounded, in a magnetizable channel 72, so as to increase the magnetic coupling with the corresponding coil-side of the machine-coil 14. The two magnetizable channels 72, of the two-coil sides 70 and 71 of each test-coil 60, are joined by insulating connecting-members 73, so that the test-coil 60 can be conveniently handled and applied to successive portions of the air-gap of the machine, so as to successively induce test-voltage in different ones of the machine-coils 14. In general, the length, as well as the span, of the test-coils 60 and 60' should correspond to the dimensions of the several machine-coils 14, so that, when the surge-voltages are applied to the test-coils 60 or 60', these coils will act as the primary windings of transformers for inducing a test-voltage in a machine-coil 14 over which the test-coil is placed.

In operation, it will be noted that an important feature of my invention is that I apply the surge-voltage to an individual machine-coil, as distinguished from a pair of winding-terminals of the machine to be tested. The significance of this statement will be realized if I digress, for a moment, to consider the results which would have been accomplished if the surge-voltage had been applied to the machine-terminals, as in prior-art practice, rather than to an individual machine-coil 14. In the particular machine which I have shown for illustration, the maximum high-frequency or surge-voltage which could be applied to any pair of machine-terminals 6 and 7 would be approximately 5,000 volts R. M. S., as higher voltages would overstress the insulation between the coil-conductors and the ground or magnetizable core-member 5. As the machine had eighty turns in each of the parallel-connected winding-sections, such as 11, this voltage would give an average of approximately 62 volts per turn, which is not enough to stress the turn-insulation high enough to develop incipient or actual faults.

By my method, I am able to stress this turn-insulation to values from approximately 300 to 600 volts per turn, or, in general, whatever other voltage may be necessary to adequately stress the turn-insulation, so as to develop any incipient weaknesses or faults during the test. If each machine-winding coil 14 has ten turns in it, this means a total test-voltage of between 3,000 and 6,000 volts, which is of the order of magnitude of the previously indicated maximum surge-voltage of approximately 5,000 volts, which is imposed by the ground-insulation strength.

It will be noted that, when this surge-voltage is impressed on an individual coil 14 of a winding-group or circuit, such as 11, this winding-group or circuit does not act as an autotransformer stepping up the surge-voltage, because there is no substantial magnetic coupling between the successive coils of the serially connected coils which compose the complete winding-section 11. Rather, the impedances of the rest of the coils of the circuit act as a serially connected impedance, in series with the surge-voltage which is induced in the particular coil under test, to reduce the surge-voltage which appears in the winding-terminals 6—7; and this terminal surge-voltage is still further reduced by the load which is imposed by the eleven other parallel-connected winding-circuits, only two of which are indicated, at 12 and 13, in Fig. 1. Nevertheless, the surge-voltage which appears across the winding-terminals 6 and 7 is sufficient to energize the oscilloscope 31, so as to produce a satisfactory trace of the wave-form in the several coils of the machine-winding, as they are successively tested by successive applications of the repetitive surge-voltage to successive coils.

It should be understood that the circuits which I have shown in Fig. 1 are simplified circuits, which are considered to be in sufficient detail to illustrate the principles of the invention, without all of the refinements which are known to the art, and described in such literature as the Foust and Rohets paper in Electrical Engineering, April 1943, Transactions, page 203, and a Moses and Harter paper in Electrical Engineering, July 1945, Transactions, page 499, and in the literature referred to in these two papers.

When I speak of a repetitive surge, I mean a surge which repeats itself once during each cycle of the 60-cycle supply or control-circuit 22. Each surge, in general, will be a highly damped oscillatory surge, at a high frequency which is determined by the relative magnitudes of the inductive and capacitive reactances of the discharge-circuit, including the capacitive couplings between the several stator-windings.

An illustrative trace is shown on the oscilloscope screen 32, the larger trace 81 being obtained from an exploring or test-coil which is located on an unfaulted coil 14 of the machine, while the smaller trace 82 is obtained from an exploring coil over a short-circuited machine-coil.

While I have illustrated my invention in a single preferred form of embodiment, I wish it to be understood that I am not limited to the precise details of the apparatus, or to the precise details of the machine to which my testing apparatus is applied. I desire, therefore, that the appended claims shall be accorded the broadest construction consistent with their language.

I claim as my invention:

1. Testing apparatus and circuits for testing the turn-insulation of a wound core-member of a type having a multi-turn winding having a winding-portion comprising a plurality of serially connected similar coils having coil-sides disposed adjacent to a cylindrical air-gap in different positions around an electrical machine, said testing apparatus and circuits comprising a source of repetitive surge-voltage, means adapted to apply said surge-voltage successively to each of different coils of such serially connected coils, and wave-responsive apparatus adapted to be connected in series with the entire series of such serially connected coils, said wave-responsive apparatus being a means for detecting any voltage-condition indicative of a coil having faulty insulation.

2. The invention as defined in claim 1, characterized by said wave-responsive apparatus comprising a cathode-ray oscilloscope adapted to show, by substantially superimposed traces, the fault-free condition of any two such coils to which the surge-voltage may be successively applied.

3. Testing apparatus and circuits for testing the turn-insulation of a wound core-member of a type having a multi-turn winding having a winding-portion comprising a plurality of serially connected similar coils having coil-sides disposed adjacent to a cylindrical air-gap in different positions around an electrical machine, said testing apparatus and circuits comprising a source of repetitive surge-voltage, a test-coil having a coil-side having a magnetizable circuit adapted to cooperate with such an air-gap at the location of such a coil-side of such a machine, connections for applying said surge-voltage to said test-coil for causing said test-coil to act as a primary winding for applying said surge-voltage to the associated coil of such a machine, said test-coil being movable to different positions around the air-gap of such a machine, and wave-responsive apparatus adapted to be connected to such machine-terminals, said wave-responsive apparatus being a means for detecting any voltage-condition indicative of a coil having faulty insulation.

4. Testing apparatus and circuits for testing the turn-insulation of a wound core-member of a type having a winding-portion comprising a plurality of parallel-connected circuits having a common pair of machine-terminals, and each of said parallel-connected circuits comprising a plurality of serially connected similar coils disposed adjacent to a cylindrical air-gap in different positions around an electrical machine, said testing apparatus and circuits comprising a source of repetitive surge-voltage, two test-coils adapted to be applied to such an air-gap at the locations of two such machine-coils located in similar electrical positions in two of such parallel-connected circuits, each test-coil having a coil-side having a magnetizable circuit adapted to cooperate with such an air-gap at the location of such a coil-side of such a machine, connections for alternately applying said surge-voltage first to one and then to the other of said two test-coils for causing each test-coil to act as a primary winding for applying said surge-voltage to the associated coil of such a machine, said test-coils being movable to different positions around the air-gap of such a machine, and a cathode-ray oscilloscope adapted to be connected to such machine-terminals of such parallel-connected circuits and adapted to show, by substantially superimposed traces, the fault-free condition of any two such coils to which the surge-voltage may be successively applied.

5. Testing apparatus and circuits for testing the turn-insulation of a wound core-member of a type having a multi-turn winding having a winding-portion comprising a plurality of serially connected similar coils having coil-sides separated by a common coil-span and disposed adjacent to a cylindrical air-gap in different positions around an electrical machine, said testing apparatus and circuits comprising a source of repetitive surge-voltage, a test-coil having two coil-sides separated by said common coil-span, said test-coil being applicable to such an air-gap at the location of such a coil to be tested, connections for applying said surge-voltage to said test-coil for causing said test-coil to act as a primary winding for applying said surge-voltage to the associated coil of such a machine, said test-coil being movable to different positions around the air-gap of such a machine, and wave-responsive apparatus adapted to be connected to such machine-terminals of such parallel-connected circuits, said wave-responsive apparatus being a means for detecting any voltage-condition indicative of a coil having faulty insulation.

6. Testing apparatus and circuits for testing the turn-insulation of a wound core-member of a type having a winding-portion comprising a plurality of parallel-connected circuits having a common pair of machine-terminals, and each of said parallel-connected circuits comprising a plurality of serially connected similar coils separated by a common coil-span and disposed adjacent to a cylindrical air-gap in different positions around an electrical machine, said testing apparatus and circuits comprising a source of repetitive surge-voltage, two test-coils adapted to be applied to such an air-gap at the locations of two such machine-coils located in similar electrical positions in two of such parallel-connected circuits, each test-coil having two coil-sides separated by said common coil-span, connections for alternately applying said surge-voltage first to one and then to the other of said two test-coils for causing each test-coil to act as a primary winding for applying said surge-voltage to the associated coil of such a machine, said test-coils being movable to different positions around the air-gap of such a machine, and a cathode-ray oscilloscope adapted to be connected to such machine-terminals of such parallel-connected circuits and adapted to show, by substantially superimposed traces, the fault-free condition of any two such coils to which the surge-voltage may be successively applied.

7. The invention as defined in claim 5, characterized by each coil-side of the test-coil having a magnetizable circuit adapted to cooperate with the air-gap at the location of a coil-side of such a machine.

8. The invention as defined in claim 6, characterized by each coil-side of each test-coil having a magnetizable circuit adapted to cooperate with the air-gap at the location of a coil-side of such a machine.

JOHN S. JOHNSON.

REFERENCES CITED

The following references are of record in the file of this patent:

UNITED STATES PATENTS

| Number | Name | Date |
|---|---|---|
| 1,464,119 | Stoller et al. | Aug. 7, 1923 |
| 2,185,292 | Candler et al. | Jan. 2, 1940 |
| 2,321,424 | Rohats | June 8, 1943 |

FOREIGN PATENTS

| Number | Country | Date |
|---|---|---|
| 80,629 | Sweden | Apr. 12, 1934 |

OTHER REFERENCES

Publication, "Winding-Fault Detection and Location by Surge-Comparison Testing" in Electrical Engineering Transactions, July 1945, vol. 64, pages 499 to 503.

Publication, "A New Method of Detecting and Locating Insulation Faults" in Instruments, Oct. 1945, vol. 18, pages 682 and 683.